(12) United States Patent
Wolf et al.

(10) Patent No.: US 8,533,357 B2
(45) Date of Patent: Sep. 10, 2013

(54) MECHANISM FOR BINDING A STRUCTURED DATA PROTOCOL TO A PROTOCOL OFFERING UP BYTE STREAMS

(75) Inventors: Kenneth D. Wolf, Seattle, WA (US); Michael Steven Vernal, Seattle, WA (US); Christopher G. Kaler, Sammamish, WA (US); Elliot Lee Waingold, Seattle, WA (US); Erik Bo Christensen, Seattle, WA (US); Jeffrey C. Schlimmer, Redmond, WA (US); Martin James Gudgin, Sale (GB); Siddhartha Puri, Sammamish, WA (US)

(73) Assignee: Microsoft Corporation, Redmond, WA (US)

(*) Notice: Subject to any disclaimer, the term of this patent is extended or adjusted under 35 U.S.C. 154(b) by 1679 days.

(21) Appl. No.: 11/003,847

(22) Filed: Dec. 3, 2004

(65) Prior Publication Data

US 2006/0133427 A1    Jun. 22, 2006

(51) Int. Cl.
*G06F 15/16* (2006.01)
(52) U.S. Cl.
USPC ............ 709/236; 709/203; 709/231; 709/245
(58) Field of Classification Search
USPC ....................................................... 709/203
See application file for complete search history.

(56) References Cited

U.S. PATENT DOCUMENTS

| | | | | |
|---|---|---|---|---|
| 5,684,954 A * | 11/1997 | Kaiserswerth et al. | ...... | 709/236 |
| 5,983,022 A * | 11/1999 | Watkins et al. | ............. | 717/144 |
| 6,072,783 A * | 6/2000 | Riley | ............................ | 370/294 |
| 6,546,425 B1 * | 4/2003 | Hanson et al. | ............... | 709/227 |
| 6,546,525 B2 * | 4/2003 | Sugimoto et al. | ................ | 716/4 |
| 6,980,536 B1 * | 12/2005 | Schulz et al. | ................ | 370/337 |
| 6,981,047 B2 * | 12/2005 | Hanson et al. | ............... | 709/227 |
| 7,020,729 B2 * | 3/2006 | Taborek et al. | .............. | 710/305 |
| 7,124,299 B2 * | 10/2006 | Dick et al. | .................... | 713/178 |
| 7,289,964 B1 * | 10/2007 | Bowman-Amuah | ............. | 705/1 |
| 2002/0169700 A1 * | 11/2002 | Huffman et al. | ................ | 705/35 |
| 2002/0174340 A1 | 11/2002 | Dick et al. | | |

(Continued)

FOREIGN PATENT DOCUMENTS

CN    1783881       6/2010
EP    1 667 404 B1  6/2009

(Continued)

OTHER PUBLICATIONS

Kiss, Roman "SoapMSMQ Transport" Online, Jul. 14, 2004, Retrieved from the Internet: URL:http://www.codproject.com/cs/webservices/SoapMSMP.asp> Retrieved on Feb. 17, 2006.

(Continued)

*Primary Examiner* — Richard G Keehn
(74) *Attorney, Agent, or Firm* — Merchant & Gould P.C.

(57) ABSTRACT

A mechanism for sending structured data using a corresponding byte stream. Upon accessing structured data such as a Simple Object Access Protocol (SOAP) envelope, a byte stream is generated. The byte stream includes bytes that represent the structured data, as well as a collection of bytes that represents properties about the byte stream such as, for example, a mode of communication. The byte stream may then be passed to a communication module (e.g., a TCP or Named Pipes module) capable of receiving and transmitting the byte stream.

39 Claims, 4 Drawing Sheets

(56) References Cited

U.S. PATENT DOCUMENTS

| | | | |
|---|---|---|---|
| 2002/0184373 A1* | 12/2002 | Maes | 709/228 |
| 2003/0046317 A1 | 3/2003 | Cseri et al. | 715/513 |
| 2003/0051026 A1* | 3/2003 | Carter et al. | 709/224 |
| 2003/0084443 A1* | 5/2003 | Laughlin et al. | 725/39 |
| 2003/0120811 A1* | 6/2003 | Hanson et al. | 709/245 |
| 2003/0191848 A1* | 10/2003 | Hesselink et al. | 709/229 |
| 2004/0003041 A1* | 1/2004 | Moore et al. | 709/204 |
| 2004/0010616 A1* | 1/2004 | McCanne | 709/238 |
| 2004/0030750 A1* | 2/2004 | Moore et al. | 709/204 |
| 2004/0215746 A1* | 10/2004 | McCanne et al. | 709/219 |
| 2005/0027871 A1* | 2/2005 | Bradley et al. | 709/227 |
| 2005/0031305 A1* | 2/2005 | Kim et al. | 386/69 |
| 2005/0055399 A1* | 3/2005 | Savchuk | 709/203 |
| 2005/0060427 A1* | 3/2005 | Phillips et al. | 709/238 |
| 2006/0195872 A1* | 8/2006 | Seo et al. | 725/87 |

FOREIGN PATENT DOCUMENTS

| | | |
|---|---|---|
| JP | 08-079252 | 3/1996 |
| JP | 8-265534 | 10/1996 |
| JP | 10-107920 | 4/1998 |
| JP | 2004-510279 | 4/2004 |

OTHER PUBLICATIONS

Nielsen, Henrik Frystyk, "Encapsulating SOAP in DIME" IETF Standard-Working-Draft, Internet Engineering Task Force, IETF, HL, Feb. 1, 2002.

Combs, Harold, et al. "SOAP-over-UDP" Online, Sep. 2004, Retrieved from the Internet: URL:http//msdn.mircosoft.com/library/en-us/dnglobspec/html/soap-over-udp.pdf> retrieved on Feb. 16, 2006, pp. 3-6.

Wernet, Christian, et al. "Enhanced Transport Bindings for Efficient SOAP Messaging" Online, vol. 1, Jul. 15, 2005, pp. 193-200, Proceedings of the IEEE International Conference on Web Services.

European Office Action cited in Application No. 05 110 467.7, dated Jul. 16, 2008; 5 pgs.

European Notice of Allowance cited in Application No. 05 110 467.7, dated Dec. 16, 2008; 9 pgs.

Chinese Patent Office's Notice of First Office Action cited in Application No. 200510118871.4, dated Aug. 21, 2009 (in Chinese with English translation attached); 9 pages.

Japanese Patent Office Notice of Rejection cited in Application No. 2005-351277 dated Mar. 15, 2011 (in Japanese with English translation attached); 9 pages.

Japanese Patent Office Notice of Rejection cited in Application No. 2005-351277 dated Nov. 22, 2011 (in Japanese with English translation attached); 6 pages.

European extended Search Report in Application 05110467.7, mailed Mar. 3, 2006, 14 pgs.

Japanese Final Rejection and Decision to Decline the Amendment in Application 2005-351277, mailed Mar. 13, 2012, 6 pgs.

Chinese Notice of Allowance in application 200510118871.4, mailed Feb. 5, 2010, 4 pgs.

Korean Preliminary Rejection in Application 10-2005-0107997, mailed Jul. 29, 2011, 6 pgs.

* cited by examiner

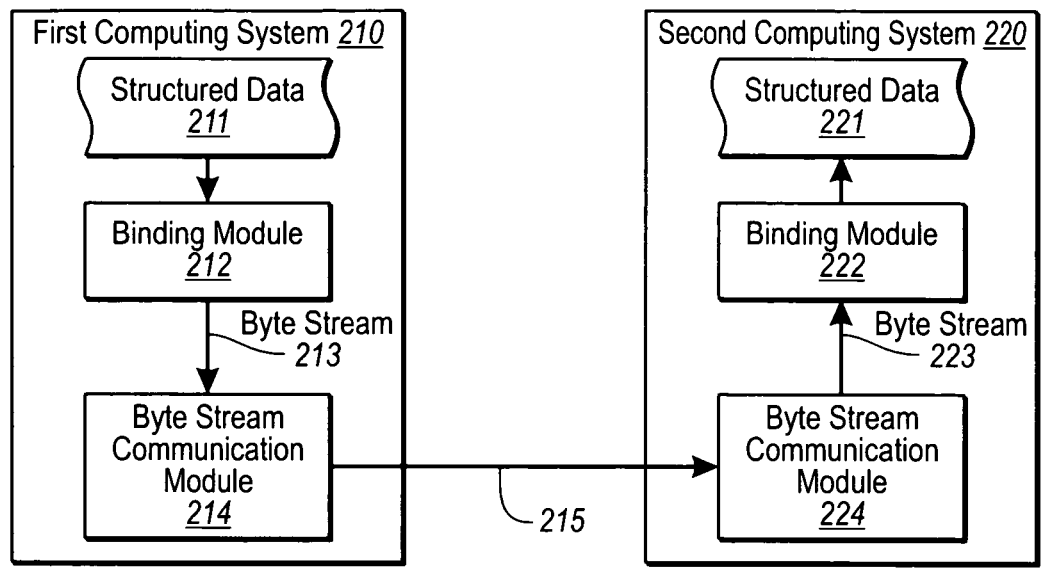
Fig. 2
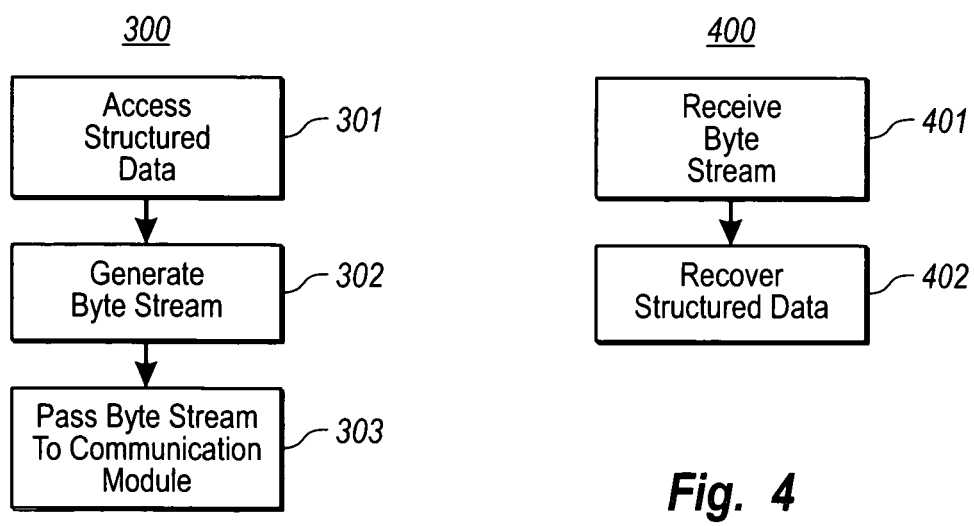
Fig. 3
Fig. 4

MECHANISM FOR BINDING A STRUCTURED DATA PROTOCOL TO A PROTOCOL OFFERING UP BYTE STREAMS

BACKGROUND OF THE INVENTION

1. The Field of the Invention

The present invention relates to network technology; and more specifically, to mechanisms for binding a structured data transport to a protocol that offers up data streams such that structured data may be communicated using two-way communications without requiring messages communicated in one direction to be correlated with messages communicated in the opposite direction.

2. Background and Related Art

Computing technology has transformed the way we work and play. Computing systems now take a wide variety of forms including desktop computers, laptop computers, tablet PCs, Personal Digital Assistants (PDAs), household devices and the like. In its most basic form, a computing system includes system memory and one or more processors. Software in the system memory may be executed by the processor to direct the other hardware of the computing system to perform desired functions.

Networking technologies enable computing systems to communicate even over vast distances, thereby expanding on computer functionality. For example, networking technologies enable such applications as e-mail, web browsing, file transfer, instant messaging, electronic whiteboarding, network collaboration, and the like. Accordingly, computer networks enable widespread communication and information access.

Data communicated between computing systems often is in a structured form, where the meaning of the data is implied at least in part by the position of the data within the structure. A software component(s) may generate or interpret at least portions of a data structure by following rules set forth by a structured data protocol. In this description and in the claims, a "structured data protocol" is broadly defined as a set of one or more rules that define how a data structure is to be formed. Potentially, multiple structured data protocols may govern different portions of a data structure.

One example of a structured data protocol includes the various versions of eXtensible Markup Language (XML). XML allows data to be structured in as a hierarchically organized node tree. A root node forms the most ancestral node in the tree. The root node may have zero or more child nodes, with each child node having zero or more child nodes and so forth. Each node has attributes and/or other text context. XML itself does not specify the identity of the node, and also does not specify the form of the hierarchical tree. Accordingly, XML is flexible enough to structurally represent many types of data.

Some structured data protocols impose additional structural rules upon basic XML. Such structured data protocols include, for example, the various versions of Simple Object Access Protocol (SOAP). SOAP defines an XML element in the form of a SOAP envelope, which represents a message that may be bound to a transport. The SOAP envelope includes child XML elements including a headers element, and a body element. The headers element may include some mandatory and optional child XML elements that define versioning, routing, address information, message identifiers, and the like. The body element includes other XML structures that may conform to one or more other structured data protocols.

SOAP is designed to be relatively transport agnostic. However, SOAP defines a default binding to HyperText Transport Protocol (HTTP) as a transport mechanism (often referred to as "SOAP-over-HTTP"). Accordingly, SOAP-over-HTTP is widely implemented. The SOAP-over-HTTP binding (and the underlying HTTP protocol) has a number of limitations that attenuate its utility in client and enterprise scenarios.

First, HTTP is limited in the supported message exchange patterns since HTTP is an inherently request-reply protocol. Specifically, the initiator of an HTTP interaction sends a single request to a service and then waits for a response on the underlying Transmission Control Protocol connection. The response may be ignored thereby simulating a one way communication represented by the request. However, this simulation wastes valuable network bandwidth since the response includes unused information. Accordingly, HTTP only effectively supports the basic single request—single response message exchange pattern. This results in a number of limitations. For instance, a server has no way to send an unsolicited response to a client (i.e., a one-way message). Also, a client may have at most one request pending at a time for a given TCP connection. A second request cannot be initiated until the first response has been received. Furthermore, a server may respond only once to a given request. Finally, because the server is holding a network connection open while processing a request, the time in which the server is to process the message is typically limited, thereby preventing long-running interactions.

Secondly, the deployed HTTP infrastructure does not generally support streaming HTTP request messages. Such streaming of request messages is referred to as "chunking". This makes it difficult to stream large messages, like multiple megabyte business documents, in a request message. Buffering large messages is generally prohibitively expensive in terms of computer resources.

Thirdly, to activate security with HTTP, an interaction must negotiate from HTTP to the HTTP Secure (HTTPS) protocol. Because HTTPS is a different protocol (with a different TCP port and a different Uniform Resource Identifier (URI) scheme), communication infrastructure generally needs to special-case the negotiation from HTTP to HTTPS. For example, there may be duplicate entries in a routing table; one for supporting HTTP, and one for supporting HTTPS. This is also inefficient in terms of computing resources.

Accordingly, what would be advantageous are mechanisms for binding structured data protocols such as XML and/or SOAP to an underlying transport in a manner that allows for flexible message exchange patterns, that permits data streaming, and that facilitates convenient activation of security.

BRIEF SUMMARY OF THE INVENTION

The foregoing problems with the prior state of the art are overcome by the principles of the present invention, which are directed towards a mechanism for sending structured data to a second computing system using a corresponding byte stream. Since the structured data is converted into a byte stream for communication, any communication module or protocol capable of communicating bytes streams may be used for communication, rather than being limited to HyperText Transport Protocol (HTTP).

Upon accessing structured data such as a Simple Object Access Protocol (SOAP) envelope, a byte stream is generated. The byte stream includes bytes that represent the structured data, as well as a collection of bytes that represent properties about the byte stream. The byte stream may then be passed to a communication module (e.g., a TCP or Named Pipes module) capable of receiving and transmitting the byte stream. These properties may be wide-ranging as will be evident from the following detailed description.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 2 illustrates a network environment in which the principles of the present invention may be employed;

FIG. 3 illustrates a method for sending structured data by first converting the structured data into a byte stream include a representation of the structured data as well as representing property information regarding the structured data;

FIG. 4 illustrates a method for receiving structured data by first receiving a bytes stream that represents both the structured data as well as properties of the byte stream;

DETAILED DESCRIPTION OF THE PREFERRED EMBODIMENTS

Figure 1:
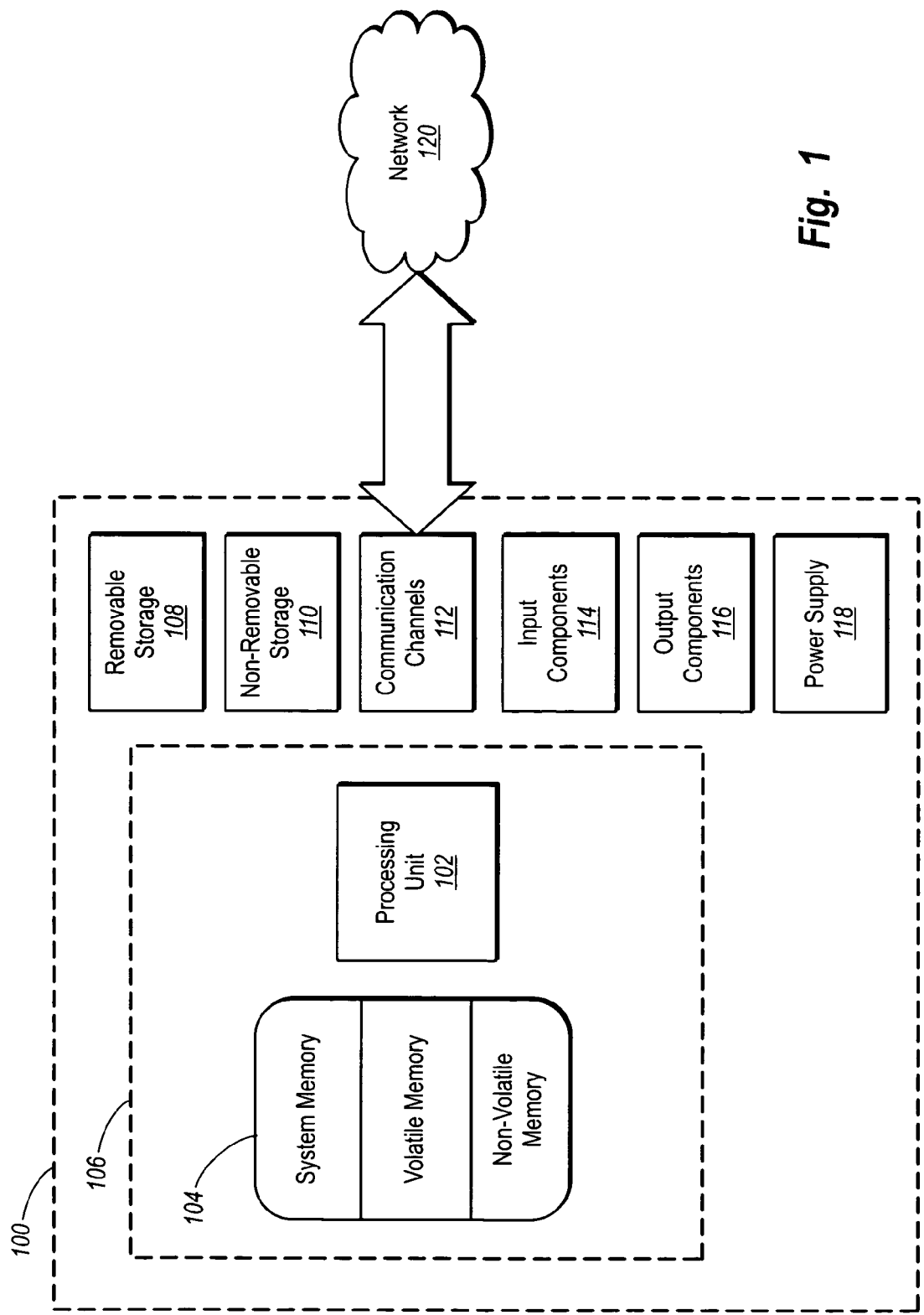
FIG. 1 illustrates a suitable computing system that may implement features of the present invention.

The principles of the present invention relate to a mechanism for sending structured data using a corresponding byte stream. Upon accessing structured data such as a Simple Object Access Protocol (SOAP) envelope, a byte stream is generated. The byte stream includes bytes that represent the structured data, as well as a collection of bytes that represent properties about the byte stream such as, for example, a mode of communication. The byte stream may then be passed to a communication module (e.g., a TCP or Named Pipes module) capable of receiving and transmitting the byte stream. The structured data may be recovered on the receiving side in the reverse manner. Since the structured data is converted into a byte stream, any communication module (such as TCP or Named Pipes protocols) may be used to transmit the structured data, rather than relying on HTTP.

Turning to the drawings, wherein like reference numerals refer to like elements, the principles of the present invention are illustrated as being implemented in a suitable computing environment. The following description is based on illustrated embodiments of the invention and should not be taken as limiting the invention with regard to alternative embodiments that are not explicitly described herein.

In the description that follows, embodiments of the invention are described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the principles of the invention are being described in the foregoing context, it is not meant to be limiting as those of skill in the art will appreciate that several of the acts and operations described hereinafter may also be implemented in hardware.

FIG. 1 shows a schematic diagram of an example computer architecture usable for these devices. For descriptive purposes, the architecture portrayed is only one example of a suitable environment and is not intended to suggest any limitation as to the scope of use or functionality of the invention. Neither should the computing systems be interpreted as having any dependency or requirement relating to any one or combination of components illustrated in FIG. 1.

The principles of the present invention are operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over, for example, network 120. Although the network 120 may include any network type (whether now existing or to be developed in the future), examples include Token Ring, Ethernet, Bluetooth, 802.11, USB, 1394, SMS, SOAP over IP, or the like. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters") for driving them. The computing system 100 has a power supply 118. All these components are well known in the art and need not be discussed at length here.

FIG. 2 illustrates an environment 200 in which the principles of the present invention may be employed. The network environment may include any number of computing systems. However, a first computing system 210 and a second computing system 220 are shown for clarity. The first computing system 210 and the second computing system are communicatively couplable to each other. In this description and in the claims, two computing systems are "communicatively couplable" when they have the ability to be communicatively coupled to each other. In this description and in the claims, two computing systems are "communicatively coupled" if they communicate one with another. The two computing systems 210 and 220 may even be integrated within the same computing system or device, but still communicate using the principles of the present invention. For example, one computing system may represent a storage mechanism, while the other sends and receives information from the storage mechanism using the principles of the present invention.

In accordance with the principles of the present invention, a binding module 212 accesses structured data 211 and serves to bind the structured data protocol that governs the structure of the structured data 211 with a byte stream protocol that offers up a byte stream. The byte stream communication module 214 is modified by the terms "byte stream" to emphasize that the communication module offers up a byte stream for communication with other computing systems in accordance with a byte stream protocol. In this description and in the claims, a "byte stream" is defined as sequences of fields. In some cases, one will not know a priori the length of the byte stream. In other cases, the length may be known and/or fixed sized. All of these cases fall within the definition of "byte stream" as used herein.

In one embodiment, the structured data 211 may be a hierarchically structured document such as, for example, an eXtensible Markup Language (XML) document. In one particular embodiment, the XML document may be a Simple Object Access Protocol (SOAP) document. Examples of suitable byte stream protocols include, for example, Transmission Control Protocol and Named Pipes. The binding module 212 completes the binding with the byte stream protocol by converting the structured data 211 into a byte stream 213, and then provides the byte stream 213 to the byte stream communication module 214. The byte stream communication module 214 then sends the data as represented by arrow 215 to the second computing system 220. A similar byte stream communication module 224 at the second computing system 220 receives the data, and offers the data up as a byte stream 223 to the binding module 222. The binding module recovers the structured data 221.

Having broadly described the principles of the present invention, a more detailed operation of a particular embodiment will be described with respect to FIGS. 3 and 4. FIG. 3 illustrates a flowchart of a method 300 for sending structured data by first converting the structured data into a byte stream include a representation of the structured data as well as representing property information regarding the structured data. The method 300 may be performed by the binding module 212 when sending structured data 211 to the second computing system 220.

The binding module 212 accesses structured data for transmission to the second computing system (act 301). The binding module 212 may access the structured data by, for example, receiving some or all of the structured data from other component or computing system and/or by generating some or all of the structured data. As previously mentioned, examples of the structured document include XML documents and SOAP envelopes. The following represents an example of a SOAP envelope (expressed using SOAP version 1.2 although the principles of the present invention are not limited to this version) that might be desired to be transmitted to the second computing system 220.

```
<S:Envelope xmlns:S='http://www.w3.org/2003/05/soap-envelope'>
  <S:Body/>
<S:Envelope>
```

This three line SOAP envelope is just a simple example and will be used as an example throughout this description for purposes of further clarifying the operation of an embodiment of the present invention.

Figure 5:
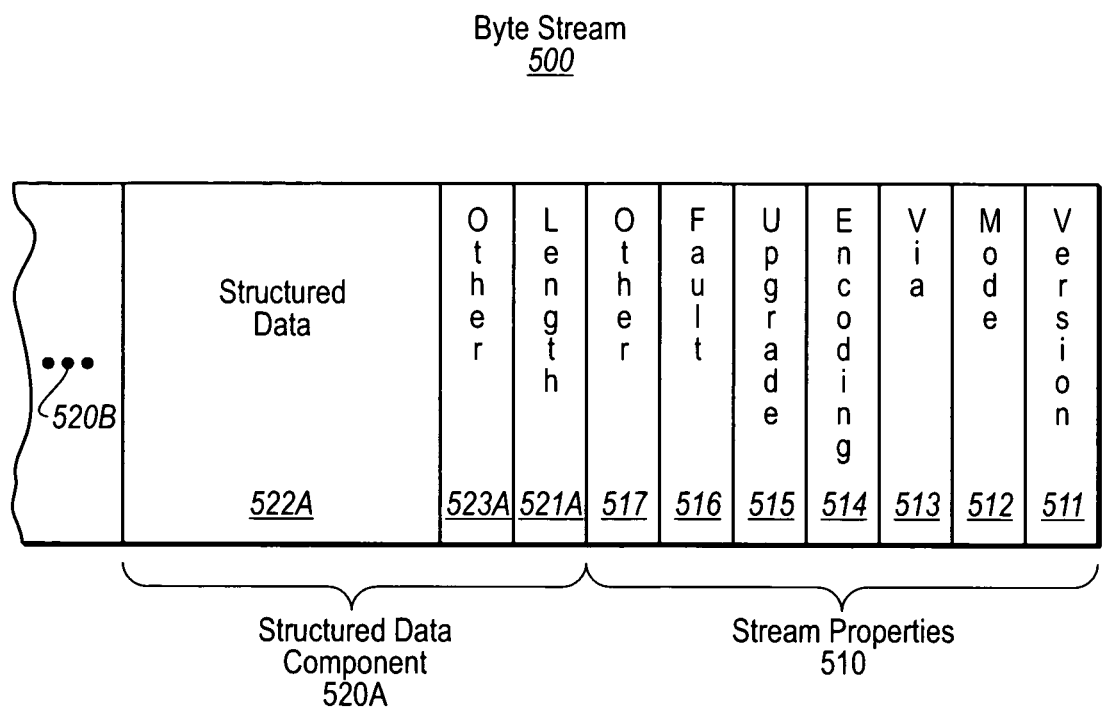
FIG. 5 illustrates a data structure of a byte stream that represents both structured data as well as properties of the byte stream.

After accessing the structured data 211 (act 301), the binding module 212 converts the structured data 211 into a byte stream 213 (act 302) that includes a first plurality of bytes that collectively represent one or more properties of the byte stream, and a second plurality of bytes that collectively represent the structured data. FIG. 5 schematically shows a suitable byte stream 500 that represents an example of the byte stream 213.

Referring to FIG. 5, the byte stream 500 includes a structured data component 520A amongst potentially other structured data components 520B as represented by the horizontal ellipses. The initial information is specified as the right-most field in the byte stream 500 in FIG. 5, with successive information proceeding leftward. Each structured data component 520A and 520B includes corresponding structured data. For example, structured data component 520A includes a byte-stream representation of corresponding structured data 522A. As previously mentioned, the structured data 522A may be, for example, a SOAP envelope. Each structured data component 520A and 520B may also optionally include a length component that identifies the length of the byte stream-representation of the structured data. For example, length component 521A identifies the length of the byte-stream representation of structured data 522A. If the length of the byte stream is already known (e.g., it is a fixed size known to the receiving party), then the length field may be made optional. The length may also be negotiated using some other mechanism. Additionally, each structured data component 520A and 520B may also optionally include other information. For example, the structured data component 520A includes other field 523A.

Having the length field 512A in the byte stream allows for a number of advantages. First, malformed structured data components may simply be skipped, rather than closing the connection. Closing the connection is costly since reopening the connection takes time, processing resources, and memory resources. In addition, some of the messages that would have been received during the time the connection is closed may be lost. Second, the entire structured data may be read into memory before invoking the application code that processes the message. This allows the application to fully access the message and complete processing without having to wait for the remainder of the message to become available.

The byte stream 500 also includes stream properties 510 that define properties about the byte stream 500 as a whole. These properties may also be thought of as property records of the byte stream 500. Examples of such property records are shown. Although not shown, structured data may be interleaved between each property field to reset stream properties.

First illustrated is the version record 511, which defines the framing version of the byte stream 500. The receiving computing system may then correlate this version to a set of rules governing how to interpret the subsequent property records and/or how to recover the structured data. For example, the version information may correlate to a list of acceptable property records, and their corresponding meaning.

Next illustrated is the communication mode record 512, which defines a mode of communication. More regarding communication modes will be described below with respect to FIGS. 6A through 6C. Briefly stated, the communication modes allow for flexibility in specifying message exchange patterns and reliability. Having the mode record 512 allows a single network address (a single TCP port number, for example) to receive messages in the different modes. TCP port numbers are somewhat costly in that they are a limited resource for a given machine.

A via record 513 defines a target destination for the data stream 500. The binding module may reside in a communication protocol stack in which in upper layer in the protocol stack is sending the structured data 211 (or information represented in the structured data 211) to another destination. In so doing, the ultimate destination for that information may be further along in a communication path than the computing system represented by the address in the via record 513. Nevertheless, the via record 513 represents the address of the next binding module level destination. The via record 513 allows some level of dispatch by receiving systems without having to expense the processing resources needed to fully parse the byte stream 500 and access the structured data 522A. The value of the via record 513 may default to the previous via value, thereby reducing the size of the byte stream.

An encoding field 514 may define an encoding format for any contained structured data components 522. This allows systems to support more than one encoding on a connection, which can reduce the number of connections needed. It also allows a single address (a single TCP port number, for example) to be used for different encodings. As mentioned above, TCP port numbers can be costly. Supporting both well-known and extensible values for the content type allows extensibility without sacrificing wire size for the common values. For example, well-known content types can be encoded with a single byte, but additional content types are possible (but more verbose) by indicating string values corresponding to the MIME media types.

An upgrade field 515 indicates whether or not a security upgrade is requested or being responded to. Once two computing systems complete a security upgrade request followed by a returned positive response, the two computing systems may use security components (e.g., a Secure Sockets Layer) to further negotiate security. The upgrade field 515 need not be used for the further negotiation, but may at least be used to request a security upgrade, and confirm that security upgrade is possible, so that subsequent negotiation may perfect the security upgrade. There need not be any structured data components 520 when using the upgrade field 515. This upgrade mechanism is useful since a separate connection is not required in order to communicate securely. In addition, the upgrade field 515 may be used for other transformations of the full stream as well, such as, for example, to negotiate compression and/or encryption.

A fault field 516 allows for the communication of any fault information as when, for example, a prior data stream is not well formed, or otherwise cannot be responded to. In this case as well, there need not be any structured data components 520 when using the fault field 515.

Other field 517 represents that the list of possible property records is expandable. For example, the other fields 517 may include other information to be negotiated about the stream such as, for example, compression or encryption levels, and the like.

The following illustrates a specific example of the example three lined SOAP envelope being converted into a corresponding byte stream. In this specific example, additional text is added to each line to assist the reader in understanding the corresponding component of the bytes stream set forth in each line. Left-most in each line is a two digit number in parenthesis, the two digits representing the line number. In the example the line numbers range from 01 to 24. Immediately following the closing parenthesis of the line number is one or more clusters of two hexadecimal digits that each represent a byte. Closing each line is a human readable remarks statement beginning with a double forward slash "//". The byte stream is, of course, a stream of bytes and is not organized into lines. The following example is artificially organized into lines along logical barriers to thereby assist the reader.

| | |
|---|---|
| (01) 00 | // Version record |
| (02) 01 | // Major version is 1 |
| (03) 01 | // Minor version is 1 |
| (04) 01 | // Mode record |
| (05) 03 | // Mode is 3 (simplex) |
| (06) 02 | // Via record |
| (07) 0f | // length information (record is 23 bytes) |

-continued

| | |
|---|---|
| (08) 68 74 74 70 3a 2f 2f 65 | // UTF-8 for "http://e" |
| (09) 78 61 6d 70 6c 65 2e 6f | // UTF-8 for "xample.o" |
| (10) 72 67 2f 64 65 73 74 | // UTF-8 for "rg/dest" |
| (11) 03 | // Known Encoding Record |
| (12) 03 | // SOAP 1.2, UTF-8 |
| (13) 06 | // Sized Envelope Record |
| (14) 54 | // length information (record is 84 bytes) |
| (15) 3c 53 3a 45 6e 76 65 6c | // UTF-8 for "<S:Envel" |
| (16) 6f 70 65 20 78 6d 6c 6e | // UTF-8 for "ope xmln" |
| (17) 73 3a 53 3d 27 68 74 74 | // UTF-8 for "s:S='htt" |
| (18) 70 3a 2f 2f 77 77 77 2e | // UTF-8 for "p://www." |
| (19) 77 33 2e 6f 72 67 2f 32 | // UTF-8 for "w3.org/2" |
| (20) 30 30 33 2f 30 35 2f 73 | // UTF-8 for "003/05/s" |
| (21) 6f 61 70 2d 65 6e 76 65 | // UTF-8 for "oap-enve" |
| (22) 6c 6f 70 65 27 3e 3c 53 | // UTF-8 for "lope'><S" |
| (23) 3a 42 6f 64 79 2f 3e 3c | // UTF-8 for ":Body/><" |
| (24) 2f 53 3a 45 6e 76 65 6c | // UTF-8 for "/S:Envel" |
| (24) 6f 70 65 3e | // UTF-8 for "ope>" |

The first line (i.e., line 01) includes the byte 00. Each record may include more than one byte. In this example, the first byte in each record identifies the record type. The 00 in this case indicates the record is a version record. The second and third lines each include one byte, the second list identifying a major version, and the third line identifying the minor version. Lines 01 through 03 together represent an example of the version record 511 of FIG. 5.

Line 04 includes one byte representing the record type identifier for the next record. The byte 01 here represents a communication mode record. Line 05 includes a byte having a value 3 representing that the operating mode is simplex. Other example communication modes include multiplex, duplex, and singleton. The meaning of each of these communication modes will be described further below with respect to FIGS. 6A through 6C. The number of communication modes may be expanded by adding more framing versions, and by properly identifying the version in the version record. Lines 04 and 05 together represent an example of the mode record 512 of FIG. 5.

Line 06 includes a record type identifier byte 02, which indicates the beginning of a via record. Line 07 identifies the length of the via record which is, in this case, 23 bytes. Lines 08 through 10 include 23 bytes representing 23 UTF-8 characters which defined the destination address as "http://example.org/dest". Lines 06 through 10 together represent an example of the via record 513 of FIG. 5.

Line 11 includes a record type identifier byte 03, which indicates the beginning of an encoding record. Line 12 includes a byte having a value of 3, which corresponds in this example to UTF-8 and SOAP version 1.2. Lines 11 and 12 together represent an M example of the encoding record 514 of FIG. 5.

Line 13 includes a record type identifier byte 06, which indicates the beginning of a sized envelope record. A sized envelope record includes both an identification of the size of the SOAP envelope, as well as the SOAP envelope itself. Specifically, Line 14 identifies the length of the SOAP envelope to be 75 bytes (or also 75 characters since one byte is used to represent each character in UTF-8). Lines 15 through 24 represent the UTF-8 for the three lined SOAP envelope originally presented in the example. Accordingly, Lines 15 through 24 collectively represent the byte stream representation of the structured data 522A of FIG. 5. Line 14 represents the length field 521A of FIG. 5. Thus, lines 13 through 24 collectively represent a structured data component 520A of FIG. 5.

Other property records may be used to express security upgrade requests or responses, to express faults, or to express other information.

Since the byte stream 500 is now a byte stream, it may be provided to any communication module that offers up a byte stream such as User Datagram Protocol (UDP), Microsoft Message Queue (MSMQ), TCP or Named Pipes. Accordingly, referring to FIG. 3, after generating the byte stream, the binding module then passes the byte stream 213 to a byte stream communication module 214 that accepts bytes streams for communication with other computing systems (act 303).

Other property records may be used to express security upgrade requests or responses, to express faults, or to express other information.

FIG. 4 illustrates flowchart of a method 400 for receiving structured data by first receiving a bytes stream that represents both the structured data as well as properties of the byte stream. The method 400 may be performed by the binding module 222 at the second computing system 220, or additionally may be performed by the binding module 212 at the first computing system 210 when receiving messages. In either case, upon receiving a message, the byte stream communication module 224 (or 214) provides a byte stream to the corresponding binding module 222 (or 212).

The binding module then receives the byte stream (act 401). The binding module may use the property records to identify the version information, communication mode and the like. The receiving binding module uses the same framing rules to interpret the byte stream as the sending binding module used to construct the byte stream. Accordingly, the receiving binding module may then recover the structured data from the byte stream (act 402). The process of sending and receiving may be repeated frequently.

Accordingly, the principles of the present invention describe a flexible mechanism for communicating structure information (such as SOAP envelope) using communication modules that offer up byte streams (such as TCP). The ability to interface with such communication modules means that the flexibility of such communication modules may be harnessed to enable a wider range of choices for message exchange patterns and reliability. TCP is not limited to a single request—single response message pattern. Many more message patterns may be used thereby overcoming one of the most inherent weaknesses of, for example, SOAP-over-HTTP. Furthermore, the mechanism allows for convenient security upgrading integrated with the framing protocol.

Figure 6A:
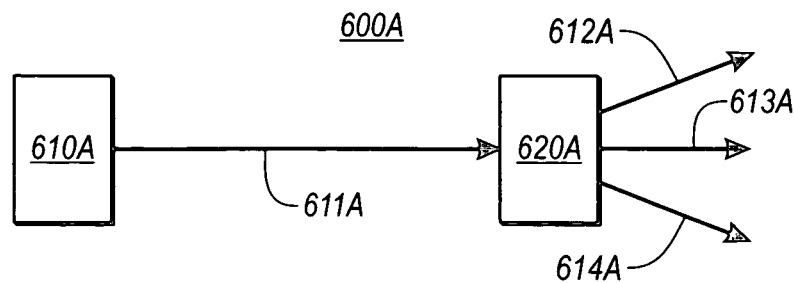
FIG. 6A illustrates a communication mode in which a single connection is used to communicate multiple outbound communications to different processes running on a single recipient computing system.
Figure 6B:
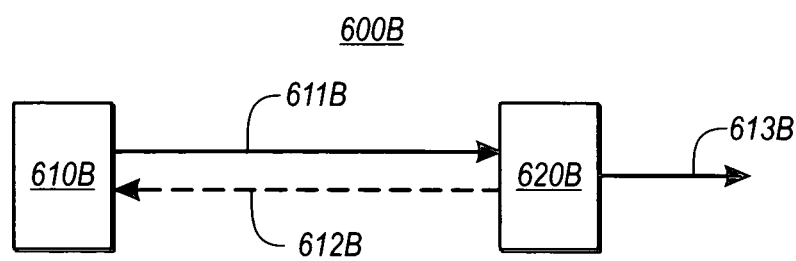
FIG. 6B illustrates a communication mode in which a single connection is used to reliably communicate one way.
Figure 6C:
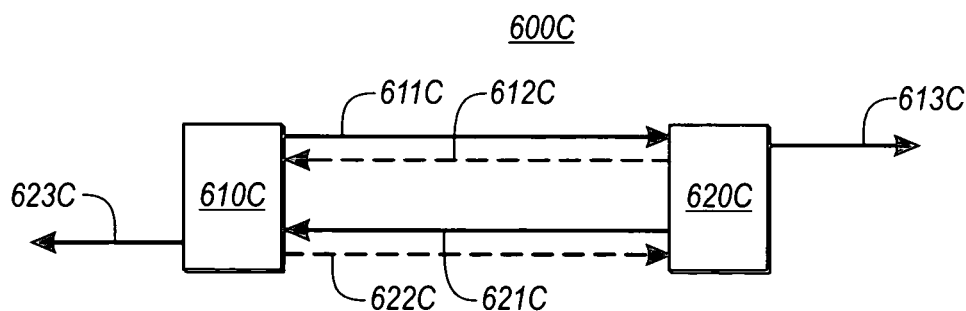
FIG. 6C illustrates a communication mode in which a single connection is used to reliably communicate both ways.

The mode of communication may also be altered. In one embodiment, this is performed by including communication mode information in the mode field 512 of the stream properties 510 of the byte stream 500 as in FIG. 5. FIGS. 6A through 6C illustrate several examples of various communication modes that may be set by the communication mode record. In each figure, component 610 represents a single connection (e.g., a TCP or Names Pipes connection) on a first computing system, while component 620 represents a single connection (e.g., a TCP or Names Pipes connection) on a second computing system.

FIG. 6A illustrates a multiplex mode. In this mode, a single connection 610A sends data to single connection 620A. At the binding layer corresponding to the binding module, even though a single connection is used to receive various messages, those various messages to be routed to different endpoints. As an example, suppose that a user associated with one Uniform Resource Identifier (URI) and TCP port (e.g., associated with connection 610A) wants to interface with an on-line book store represented another URI and TCP port (e.g., associated with connection 620A). That single TCP port may offer several different services. For example, perhaps one service offers bookstore inventory information, while another service offers book purchasing. A different connection need not be used for each request. Instead the appropriate request 611A is sent to the connection 620A for appropriate routing 612A through 614A for inventory services, and the same connections are used later for book purchasing. In the embodiment of FIG. 5, this routing may be accomplished using information in the via record 513.

FIG. 6B illustrates a simplex mode in which a single connection 610B may be used for the first computing system to reliably send a message 611B to a single connection 620B at the second commuting system. This simplex mode may likewise be identified in the mode record 512 in the embodiment of FIG. 5. To ensure reliability, there may be return acknowledgement messages or packets as represented by arrow 612B. The connection 620B offers the byte stream 613 to other layers of the protocol stack. In this mode, there may be no intermediary binding level modules between the connections in the case of TCP and Names Pipes. However, reliability is further assured. Acknowledgement messages that provide this reliability may be within, for example, the structure data itself (e.g., structured data 522A of FIG. 5) or by some other mechanism.

FIG. 6C illustrates a duplex mode in which a single connection 610C is used for the first computing system to reliably send a message 611C to a single connection 620C at the second computing system. This duplex mode may be identified in the mode record 512 in the embodiment of FIG. 5. There may be associated acknowledgement messages 612C to improve reliability, and the connection 620C offers up 613C the corresponding byte stream to other layers in the protocol stack. Likewise, in the opposite direction, the single connection 620C is used for the second computing system to reliably send a message 621C to the same connection 610C at the first computing system. There may also be associated acknowledgement messages 622C to improve reliability, and the connection 610C offers up 623C the corresponding byte stream to other layers in the protocol stack.

Although not illustrated a "singleton" mode may also be selected using the mode field 512 in the embodiment of FIG. 5. This singleton uses a single connection to send a byte stream that is not limited in size to the second computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. In a network environment that includes a first computing system communicatively couplable to a second computing system, a method of the first computing system sending first structured data via a first byte stream and second structured data via a second byte stream to the second computing system, the method comprising the following:
   an act of accessing the first structured data, wherein the meaning of the first structured data is implied at least in part by the position of data within the structure, for transmission to the second computing system;
   an act of generating the first byte stream including a first plurality of bytes that collectively represent one or more properties of the first byte stream and a second plurality of bytes that collectively represent the first structured data, wherein the first plurality of bytes comprises:
      one or more bytes defining a first communications mode record, wherein the first communications mode record defines a mode of communication for the first byte stream, and wherein the first communications mode record specifies one of a simplex mode and a duplex mode; and
      one or more bytes defining an encoding field, wherein the encoding field defines an encoding format for the first structured data, and wherein the meaning of the first structured data is implied at least in part by the position of the data within the structure, the encoding field allowing a single address to be used for different encodings;
   an act of generating the second byte stream that comprises one or more bytes defining a second communications mode record, wherein the second communications mode record specifies one of a simplex mode and a duplex mode, and wherein the second communications mode record of the second byte stream specifies a different communication mode than the first communications mode record of the first byte stream;
   an act of passing the first byte stream to a network address at the second computing system; and
   an act of passing the second byte stream to the network address at the second computing system, wherein the first byte stream and the second byte stream are passed to the network address via different communication modes.

2. The method in accordance with claim 1, wherein the act of accessing the first structure data comprising the following:
   an act of the first computing system itself generating the first structured data.

3. The method in accordance with claim 1, wherein the act of accessing the first structure data comprising the following:
   an act of the first computing system receiving the first structured data from another computing system.

4. The method in accordance with claim 1, wherein the first structured data includes XML.

5. The method in accordance with claim 1, wherein the first structured data is a SOAP envelope.

6. The method in accordance with claim 5, wherein the first byte stream and the second byte stream are passed via a Named Pipes communication connection.

7. The method in accordance with claim 5, wherein the first byte stream and the second byte stream are passed via a Transmission Control Protocol (TCP) communication connection.

8. The method in accordance with claim 5, wherein the first byte stream and the second byte stream are passed via a User Datagram Protocol (UDP) communication connection.

9. The method in accordance with claim 1, wherein the first byte stream and the second byte stream are passed via a Named Pipes communication connection.

10. The method in accordance with claim 1, wherein the first byte stream and the second byte stream are passed via a Transmission Control Protocol (TCP) communication connection.

11. The method in accordance with claim 1, wherein the first byte stream and the second byte stream are passed via a User Datagram Protocol (UDP) communication connection.

12. The method in accordance with claim 1, wherein the first byte stream and the second byte stream are passed via a Microsoft Message Queue (MSMQ) communication connection.

13. The method in accordance with claim 1, wherein the one or more properties of the first byte stream includes a target destination Uniform Resource Identifier (URI).

14. The method in accordance with claim 1, the method further comprising the following:
an act of receiving a third byte stream from the second computing system, the third byte stream including a third plurality of bytes that collectively represent one or more properties of the third byte stream, and a fourth plurality of bytes that collectively represent third structured data; and
an act of recovering the third structured data from the third byte stream.

15. A computer memory having instructions stored thereon for use in a network environment that includes a first computing system and a second computing system, wherein upon execution by one or more processors the instructions implement a method of the first computing system sending first structured data via a first byte stream to the second computing system and receiving second structured data via a second byte stream from the second computing system, the method comprising the following:
an act of accessing the first structured data, wherein the meaning of the first structured data is implied at least in part by the position of data within the structure, for transmission to the second computing system;
an act of generating the first byte stream including a first plurality of bytes that collectively represent one or more properties of the first byte stream and a second plurality of bytes that collectively represent the first structured data, wherein the first plurality of bytes comprises:
one or more bytes defining a first communications mode record, wherein the first communications mode record defines a mode of communication for the first byte stream, and wherein the communications mode record specifies one of a simplex mode and a duplex mode; and
one or more bytes defining an encoding field, wherein the encoding field defines an encoding format for the first structured data, wherein the encoding field allows a single address to be used for different encodings;
an act of passing the first byte stream to a network address at the second computing system; and
an act of receiving the second byte stream from the network address at the second computing system, wherein the second byte stream comprises one or more bytes defining a second communications mode record, wherein the second communications mode record of the second byte stream specifies a different communication mode than the first communications mode record of the first byte stream, and wherein the first byte stream is passed to the network address and the second byte stream is received from the network address via different communication modes.

16. The computer memory in accordance with claim 15, the act of accessing the first structure data comprising the following:
an act of the first computing system itself generating the first structured data.

17. The computer memory in accordance with claim 15, wherein the first structured data includes XML.

18. The computer memory in accordance with claim 15, wherein the first structured data is a SOAP envelope.

19. The computer memory in accordance with claim 18, wherein a communication connection between the first computing system and the second computing system is Named Pipes.

20. The computer memory in accordance with claim 18, wherein a communication connection between the first computing system and the second computing system is Transmission Control Protocol (TCP).

21. The computer memory in accordance with claim 18, wherein a communication connection between the first computing system and the second computing system is User Datagram Protocol (UDP).

22. The computer memory in accordance with claim 15, wherein a communication connection between the first computing system and the second computing system is Named Pipes.

23. The computer memory in accordance with claim 15, wherein a communication connection between the first computing system and the second computing system is Transmission Control Protocol (TCP).

24. The computer memory in accordance with claim 15, wherein a communication connection between the first computing system and the second computing system is User Datagram Protocol (UDP).

25. The computer memory in accordance with claim 15, wherein a communication connection between the first computing system and the second computing system is Microsoft Message Queue (MSMQ).

26. The computer memory in accordance with claim 15, wherein the one or more properties of the first byte stream include a representation of a target destination Uniform Resource Identifier (URI).

27. The computer memory in accordance with claim 15, the method further comprising the following:
an act of recovering the second structured data from the second byte stream.

28. The computer memory in accordance with claim 15, wherein the computer memory comprises non-volatile memory.

29. The computer memory in accordance with claim 15, wherein the computer memory comprises system memory.

30. In a network environment comprising a first computing system and a second computing system, a method for sending a first byte stream representing first structured data and a second byte stream representing second structured data from the first computing system to the second computing system, the method comprising:
generating a first byte stream representing the first structured data, wherein the first byte stream comprises one or more bytes defining a first communications mode record that specifies a mode of communication for the first byte stream, and wherein the first communications mode record specifies one of a simplex mode and a duplex mode;
generating a second byte stream representing the second structured data, wherein the second byte stream comprises one or more bytes defining a second communications mode record, wherein the second communications mode record specifies a mode of communication for the second byte stream, and wherein the second communications mode record specifies a different communication mode than the first communications mode record;
transmitting the first byte stream to a network address at the second computing system; and
transmitting the second byte stream to the network address at the second computing system, wherein first byte stream and the second byte stream are transmitted to the network address via different communication modes.

31. The method of claim 30, wherein the first byte stream further comprises one or more bytes defining a first encoding field, and wherein the first encoding field defines an encoding format for the first structured data.

32. The method of claim 31, wherein the second byte stream further comprises one or more bytes defining a second encoding field, and wherein the second encoding field defines an encoding format for the second structured data.

33. The method of claim 32, wherein the second encoding field is different from the first encoding field.

34. The method of claim 30, wherein the first structured data comprises XML.

35. The method of claim 30, wherein the first structured data is a SOAP envelope.

36. The method of claim 30, wherein a communication connection between the first computing system and the second computing system is Named Pipes.

37. The method of claim 30, wherein a communication connection between the first computing system and the second computing system is Transmission Control Protocol (TCP).

38. The method of claim 30, wherein a communication connection between the first computing system and the second computing system is User Datagram Protocol (UDP).

39. The method of claim 30, wherein a communication connection between the first computing system and the second computing system is Microsoft Message Queue (MSMQ).

* * * * *